United States Patent [19]
Ohmi et al.

[11] Patent Number: 4,953,826
[45] Date of Patent: Sep. 4, 1990

[54] METAL DIAPHRAGM VALVE

[75] Inventors: Tadahiro Ohmi; Yohichi Kanno; Kazuhiko Satoh; Tadahiro Hatayama, all of Sendai, Japan

[73] Assignee: Motoyama Eng. Works, Ltd., Miyagi, Japan

[21] Appl. No.: 389,704

[22] Filed: Aug. 4, 1989

[30] Foreign Application Priority Data

Aug. 12, 1988 [JP] Japan ................................ 63-200008

[51] Int. Cl.$^5$ .............................................. F16K 7/16
[52] U.S. Cl. .................................... 251/331; 251/368; 137/550
[58] Field of Search ................. 251/331, 368; 137/550

[56] References Cited

U.S. PATENT DOCUMENTS

| | | | |
|---|---|---|---|
| 1,069,067 | 7/1913 | Huxford | 251/331 X |
| 2,236,253 | 3/1941 | Testori | 251/331 X |
| 2,856,148 | 10/1958 | Heathcote et al. | 251/331 X |
| 4,828,219 | 5/1989 | Ohmi et al. | 251/331 X |

Primary Examiner—Arnold Rosenthal
Attorney, Agent, or Firm—Nilsson, Robbins, Dalgarn, Berliner, Carson & Wurst

[57] ABSTRACT

A metal diaphragm valve comprises a valve cage, a metallic valve seat integral with the valve cage, a metal diaphragm having a peripheral edge portion supported in a liquid-tight manner by the valve cage and a central portion facing the valve to touch and leave the seat, a drive member for opening and closing the metal diaphragm, and a diaphragm pressing member interposed between the drive member and the metal diaphragm and adapted to press the diaphragm against the valve seat at a uniform sealing pressure.

9 Claims, 4 Drawing Sheets

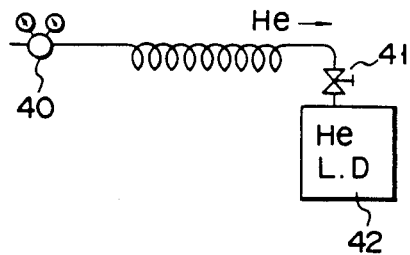
F I G. 2A
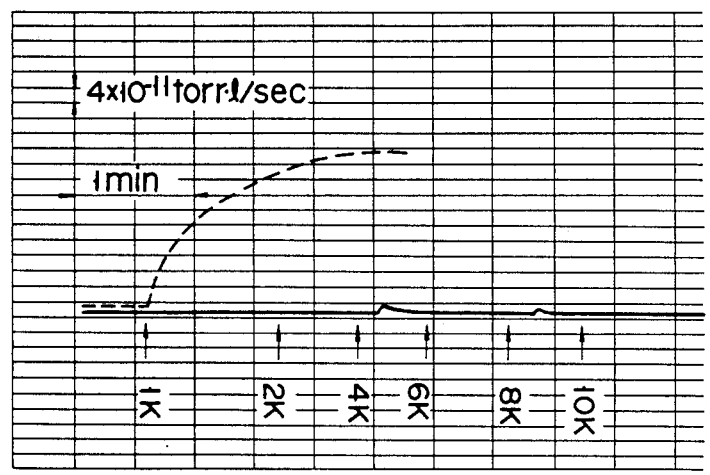
F I G. 2B

METAL DIAPHRAGM VALVE

BACKGROUND OF THE INVENTION

1. Field of the Invention

The present invention relates to a metal diaphragm valve, and more particularly, to a metal diaphragm valve adapted for use in a supply system for superhigh-purity fluid.

2. Description of the Related Art

In a supply system for superhigh-purity fluid used in manufacturing processes for LSIs, the impurity concentration must be kept below 1 ppb, i.e., at a value of the ppt level. Therefore, members constituting the supply system of this type must generally fulfill the following requirements.

A. An internal fluid, which may be harmful, must be absolutely prevented from leaking out of the supply system. Even if the internal pressure of the system is negative, moreover, external fluids, such as air, must be absolutely prevented from entering the system due to reciprocal diffusion.

B. In order to prevent production of solid particles, i.e., impurities in the internal fluid, especially those particulates attributable to abrasion at sliding contact portions, the internal passage should be absolutely free from those materials (including materials for surface treatment and the like), parts, or mechanisms (e.g., sliding contact portions) which tend to produce particulates.

C. In order to effect thorough removal of the impurities by purging with high efficiency, the internal passage should not have any dead-end space which allows the fluid to stagnate.

D. In order to prevent the supplying fluid from being lowered in purity by products of reaction, the constituent members should be highly resistant to corrosion by the fluid.

E. The internal fluid should be prevented from being lowered in purity by exudation of impurities adsorbed by the material surface, especially atmospheric constituents, e.g., water, adhering to those parts touched by the atmosphere. Also, there should be no use of such materials as hydrocarbon-based or high molecular materials, which easily absorb and desorb a relatively large quantity of detergent, water, and various other substances, so that the impurity concentration can be kept below a predetermined level. In short, the amount of impurities desorbed from the material constituting the internal passage should be minimized.

F. In order to accelerate the desorption of the impurities adsorbed or absorbed as described in item E, the members should be able to be baked to permit supplying and decompression of the fluid at high temperature.

G. In order to restrict the leakage rate to about $10^{-11}$ torr·l/sec (He) (current limit of a helium gas leak detector) or below, the leakage from the valve portion should be minimized in a closed state.

Items A to F, among all these requirements, are common subjects for the whole circulation system for superhigh-purity fluid. Items A to D are requirements for the case that the impurity concentration is within the range of the ppm level, while the requirements of items E and F are special factors related to the range of the ppb level.

For the gas absorption and desorption described in item E, it is known that metal generally exhibits values several figures smaller than those of the hydrocarbon-based or high molecular materials. Practically, therefore, it is advisable to use metal with less adsorption. It is to be understood, in view of the requirements of item F, that materials resistant to high temperature are preferred.

A shut-off valve provided in the aforementioned circulation system for superhigh-purity fluid naturally must fulfill the requirements of items A to F. If the requirement of item C is considered to be a factor essential to valves for the purpose, diaphragm valves are regarded as of the best suited construction.

Item G has conventionally been a pending problem peculiar to valves. In conventional valves having a valve seat formed of synthetic resin, for example, the amount of gas permeating the resin is so large that the leakage rate is as high as about $10^{-8}$ torr·l/sec (He). In order to improve the rate to about $10^{-11}$ torr·l/sec (He), a plurality of valves must be connected in series, so that the whole valve arrangement is cumbersome, and entails high costs.

Accordingly, valves best suited for use in the supply system for superhigh-purity fluid are expected to fulfill the following requirements.

H. The valve chamber should not have any dead space, there should not be any springs, stems or other driving elements, or sliding contact portions, and the metal diaphragm and the valve seat should be directly in contact with each other.

I. In order to prevent such gas permeation as the valves with a plastic valve seat undergo, the valve seat should be a metallic one integral with a valve cage.

J. In order to minimize the amount of gas adsorption and improve the sealing performance at the contact portion between the metal diaphragm and the valve seat, all the inner surfaces of the valve in contact with the fluid should be specularly finished to the smoothness of the submicron level.

In the conventional valves, however, the rate of leakage from the valve opening portion, described in item G, ranges from about $10^{-5}$ to $10^{-6}$ torr·l/sec (He), despite the fulfillment of the requirements of items H to J. Thus, the valves with a metallic valve seat are inferior to the ones with a plastic seat in the leakage rate. If the sealing performance is not satisfactory despite the submicron-level finishing of the valve opening portion, then the sealing surface pressure at the opening portion will not be uniform with respect to the circumferential direction of the diaphragm.

Conventionally, there has been proposed means for plating that portion of the metal diaphragm which faces the valve seat with soft metal, such as silver, in order to improve the sealing performance. In general, however, the soft metal is so poor in durability that it exfoliates in a short time or produces particulates by abrasion. Also, the soft metal has a low melting point and poor corrosion resistance, so that it is very hard to apply it to valves in a circulation system which uses various kinds of corrosive gases for the manufacture of semiconductors, for example.

SUMMARY OF THE INVENTION

The object of the present invention is to provide a metal diaphragm valve which, comprising a metal diaphragm and a metallic valve seat, enjoys very high sealing performance, and is adapted for use in a supply system for superhigh-purity fluid, and in which the leakage rate can be restricted to $10^{-11}$ torr·1/sec (He) or below.

The above object of the present invention is achieved by a metal diaphragm valve constructed as follows. The metal diaphragm valve comprises a valve cage, a metallic valve seat integral with the valve cage, a metal diaphragm having a peripheral edge portion supported in a liquid-tight manner by the valve cage and a central portion facing the valve seat to touch and leave the seat, a drive means for opening and closing the metal diaphragm, and diaphragm pressing means, interposed between the drive member and the metal diaphragm, for pressing the diaphragm against the valve seat at a uniform sealing pressure.

According to the present invention arranged in this manner, even if there are some shifts or skews of the positions of the points of action and the directions of push forces acting on the metal diaphragm, when the diaphragm is pressed against the valve seat by means of the drive member for valve operation, and if the diaphragm and the valve seat are formed of metal which cannot easily expand or contract, resulting misalignments can be absorbed or compensated by the diaphragm pressing means, and the sealing pressure at the diaphragm can be uniformly distributed with respect to the circumferential direction. Thus, the leakage rate can be kept at $10^{-11}$ torr·1/sec (He) or below. Since leakage of an internal fluid and penetration of external fluids can be effectively prevented, moreover, the impurity concentration of a superhigh-purity fluid, flowing through a supply system, can e kept substantially at a value of the ppt level.

BRIEF DESCRIPTION OF THE DRAWINGS

FIG. 2A is a diagram showing equipment for a valve leakage test;

FIG. 2B shows a characteristic curve illustrative of the result of the valve leakage test;

DETAILED DESCRIPTION OF THE PREFERRED EMBODIMENTS

Preferred embodiments of the present invention will now be described with reference to the accompanying drawings.

Figure 1:
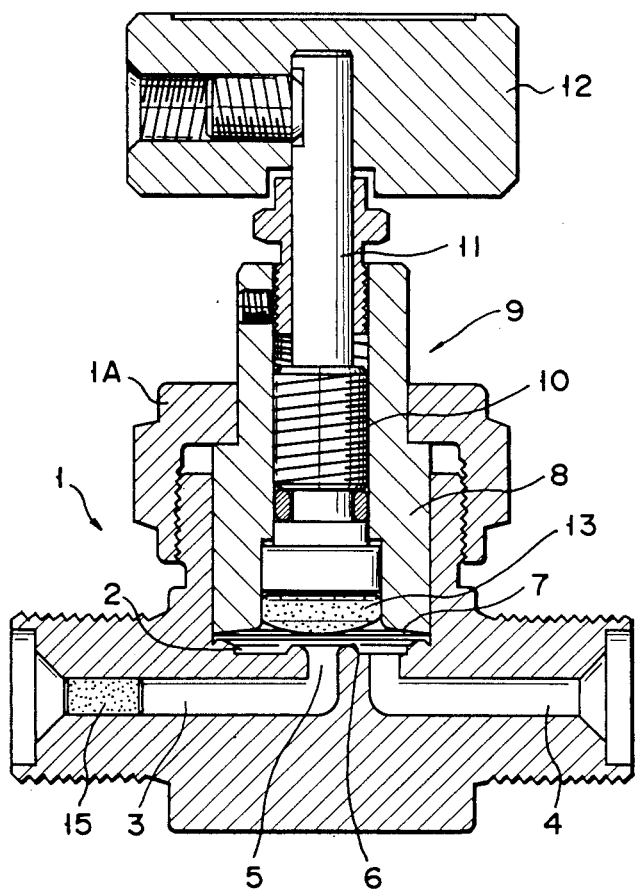
FIG. 1 is a sectional view showing a first embodiment of a metal diaphragm valve according to the present invention.

FIG. 1 shows a first embodiment of the present invention. A metal diaphragm valve according to this first embodiment comprises valve cage 1 which has nut 1A. Cage 1 is formed with valve chamber 2 and inflow and outflow passage 3 and 4 opening into the chamber. Ring-shaped valve seat 6 is provided the chamber-side opening portion of passage 3 or the opening portion of valve hole 5, so as to project in chamber 2. The valve seat, which is integral wi valve cage 1, is formed of a suitable metal material. The diaphragm valve includes metal diaphragm 7, which is formed of a single or a plurality of circular meets of a suitable metal material capable of elastic deformation. The peripheral edge portion of diaphragm, which is supported in a liquid-tight manner by valve cage 1 and bonnet 8, constitutes a wall of valve chamber 2. The central portion of diaphragm 7 faces valve seat 6 so as to be able to touch and leave these. The respective inner surfaces of inflow passage 3, valve chamber 2, and outflow passage 4, which are in contact with a fluid flowing through the same, are all specularly finished to the smoothness of the submicron level.

Drive section 9 for valve operation include valve shaft 11, which has male screw portion 10 at one end portion engaged with the female screw portion of bonnet 8, and handle 12 at the outer and portion of shaft 11. Press member 13 is interposed between metal diaphragm 7 and shaft 11. Member 13 as a curved-surface end portion or a substantially spherical-surface portion, which projects toward diaphragm 7. The press member is formed of resin material with relatively high heat resistance, such as Polyimide or Polyamide Imide.

In this arrangement, the valve can be closed by rotating handle 12 in a predetermined direction to advance valve shaft 11 axiallY so the metal diaphragm 7 is pressed against valve seat 6 by means of press member 13. In contrast with this, the valve can be opened by retreating shaft 11 so that diaphragm 7 is disengaged from seat 6 by its own restoring force.

In the valve constructed in this manner, valve cage 1 is formed of metal material, and the peripheral edge portion of metal diaphragm 7 is fixed in a liquid-tight manner to the wall of cage 1, thereby defining valve chamber 2. Therefore leakage of the internal fluid and penetration of external fluids can be securely prevented. Since there are no sliding contact portions in the passage extending from inflow passage 3 to outflow passage 4 via chamber 2, no particulates can be produced by abrasion. Further, nonmetallic materials, which are liable to absorb and desorb fluids, are not used in the passage, and all the surfaces in contact with the fluid are specularly finished to the smoothness of the submicron level, so that no impurities can be induced. Since all the materials used have satisfactory heat resistance, moreover, they can be easily baked, and the amount of impurities produced in the valve can be minimized. Since no substantial dead space is defined in the passage, furthermore, effective purging can be made in a short period of time.

The valve opening portion of the metal diaphragm valve is specularly finished to the smoothness of the submicron level, as mentioned before so that good contact can be obtained. Also, metal diaphragm 7 is pressed against valve seat 6 by means of elastically deformable press member 13. Even if here are some misalignments between the points of action and the directions of push forces between press member 13 and valve shaft 11 and between diaphragm and seat 6, therefore, they can be absorbed or compensated by elastic deformation of member 13. As a result, a uniform sealing pressure acts on the contact portions of valve seat 6 and diaphragm 7 through the circumference thereof. Thus, the sealing performance at the valve can be considerably improved as compared to a typical one. Since valve seat 6 is formed of metal material, moreover, it is not permeable to gas.

Further, filter 15, which is formed of a metal material having the same anti-corrosivity as valve cage 1, are arranged in inflow passage 3.

The surfaces in contact with each other when closing the valve in metal diaphragm and valve seat 6, are specularly finished to submicron- level smoothness, in order to prevent valve leakage. Therefore, when a metal diaphragm valve is mounted in a flow passage through which fluid, including impurities such as solid particles and the like, flow, and the fluid flow into a passage formed between the valve seat and metal diaphragm, it is impossible to maintain the specularly finished surface free from damage. The metal diaphragm valve according to this invention, since a filter is arranged in the inflow passage, the impurities can be eliminated by the filter, and therefore, the metal diaphragm valve can be used for such fluid.

The following is a description a valve leakage test conducted by the inventor hereof.

According to this test, it was ascertained that the leakage rate of the valve with the aforementioned construction can be kept at $10^{-11}$ to torr·1/sec (He) or below during a repeated test for tens of thousands of cycles, and the valve enjoys very high reproducibility and reliability.

In FIG. 2A, which shows testing equipment, numeral 40, 41 and 42 designate a pressure regulator, a metal diaphragm valve to be tested, and a helium gas leak detector, respectively.

Helium gas is adjusted to a pressure of 1 K to 10 K by means of pressure regulator 40, a is then supplied to metal diaphragm valve 41. The leakage of the gas is detected by means of gas leak detector 42.

FIG. 2B shows the result of the detection. If there is any leakage, the characteristic indicated by broken line is obtained. As the operation is repeated, the leakage of the metal diaphragm valve of the present invention is reduced in proportion. After 100 cycles of break-in, it falls below the detection sensitivity of leak detector 42. In a typical diaphragm formed of synthetic resin, gas permeates the material, so that the leakage never falls below the sensitivity of detector 42.

In the valve according to the present invention, the leakage is minute because the valve is provided with the means (elastically deformable press member 13 in the first embodiment) for pressing metal diaphragm 7 against valve seat 6 at a uniform sealing pressure, as mentioned above.

Figure 3:
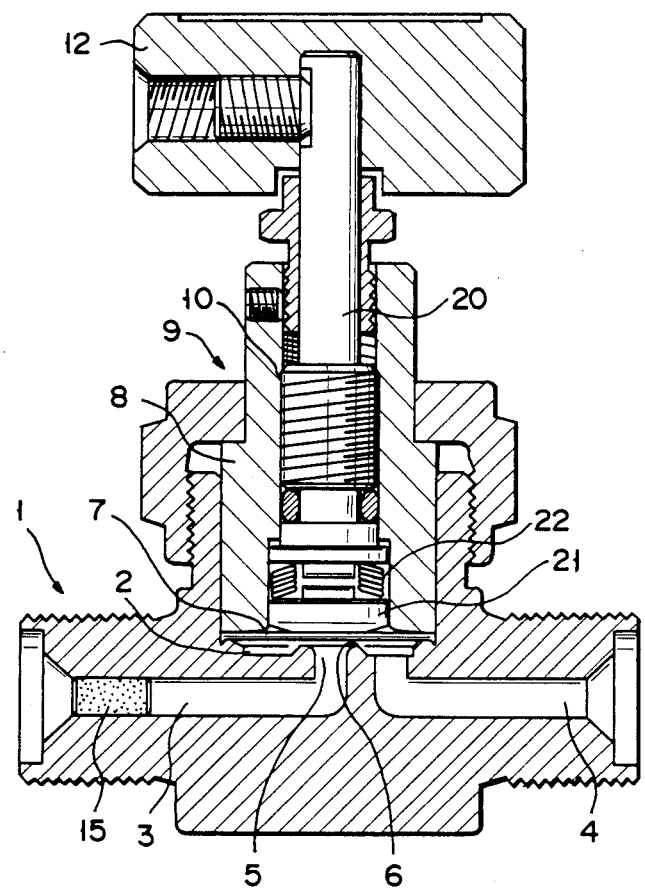
FIG. 3 is a sectional view showing a second embodiment of the metal diaphragm valve according to the invention.

FIG. 3 shows a second embodiment of the invention. In this second embodiment, spring member 22 is interposed between the lower end of valve shaft 20 and press member 21.

Figure 4:
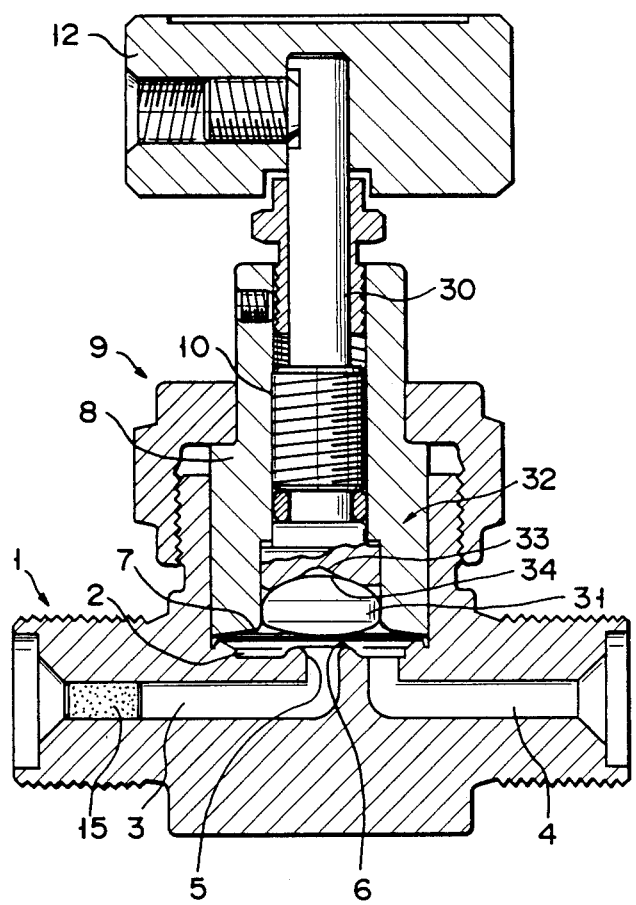
FIG. 4 is a sectional view showing a third embodiment of the metal diaphragm valve according to the invention.

FIG. 4 shows a third embodiment of the invention. In this third embodiment, automatic inter-alignment mechanism 32 is provided between valve shaft 30 and press member 31. In this arrangement member 31 is automatically center-aligned as conical recess 33 at the lower end portion of shaft 30 and spherical projection 34 of member 31 engage each other.

In both of the second and third embodiments, the other portions are constructed substantially in the same manner as their counterparts of the first embodiment, so that like reference numerals are used to designate like portions throughout the drawings. It is to be understood, moreover, that the same functions and effects of the first embodiment can provided by the second and third embodiments.

What is claimed is:

1. A metal diaphragm valve comprising:
   a valve cage;
   a metallic valve seat integral with the valve cage;
   a metal diaphragm having a peripheral edge portion supported in a liquid-tight manner by the valve cage and a central portion facing the valve seat to touch and leave the seat;
   a drive means for opening and closing the metal diaphragm; and
   diaphragm pressing means formed of resin material, interposed between the drive means and the metal diaphragm, for pressing the diaphragm against the valve seat at a uniform sealing pressure.

2. The metal diaphragm valve according to claim 1, wherein said valve cage and said metal diaphragm each has a specularly finished surface defining a passage and in contact with a fluid.

3. The metal diaphragm valve according to claim 1, wherein said diaphragm pressing mean includes a substantially spherical-surface portion in contact with the metal diaphragm.

4. The metal diaphragm valve according to claim 3, wherein said diaphragm pressing means is formed of heat-resisting material.

5. The metal diaphragm valve according to claim 3, further comprising a spring member provided between the drive means and the diaphragm pressing means.

6. The metal diaphragm valve according to claim 3, further comprising means for adjusting the position of the pressing means, said adjusting means being formed between the drive means and the pressing means.

7. The metal diaphragm valve according to claim 1, further comprising filter means for eliminating impurities which flow between said metallic valve seat and metal diaphragm.

8. The metal diaphragm valve according to claim 1, wherein said diaphragm pressing means is made of Polyimide or Polyamide Imide.

9. The metal diaphragm valve according to claim 3 wherein said drive means includes a shaft having a lower end portion provided with conical recess means for engaging with the spherical-surface portion of said pressing means.

* * * * *